April 28, 1942.     C. E. STEVENS     2,281,082

SWIVEL CONNECTION

Filed May 22, 1940

INVENTOR.
Clarence Everett Stevens
BY Thomas C. Betts
his ATTORNEY.

Patented Apr. 28, 1942

2,281,082

UNITED STATES PATENT OFFICE 2,281,082

SWIVEL CONNECTION

Clarence Everett Stevens, Greenwich, Conn., assignor to Electrolux Corporation, Dover, Del., a corporation of Delaware Application May 22, 1940, Serial No. 336,493

7 Claims. (Cl. 285—97.3)

My invention relates to a vacuum cleaner nozzle and more particularly to an improved fluid-conveying swivel connection to be used with such a nozzle.

Further objects and advantages of my invention will be apparent from the following description considered in connection with the accompanying drawing which forms a part of this specification and of which:

Figure 1:
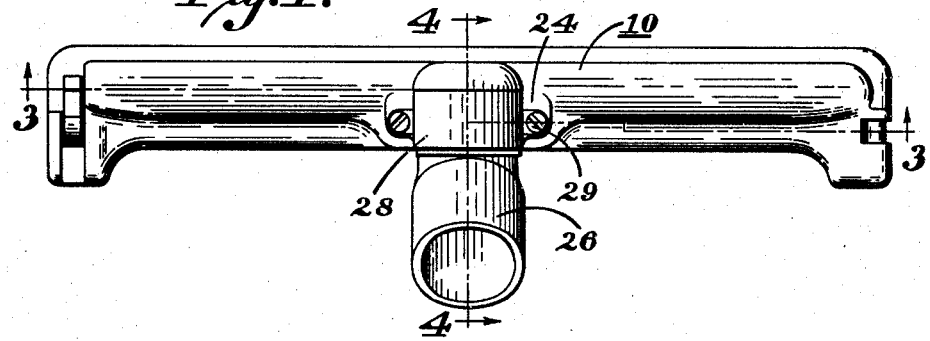
Fig. 1 is a top view of a nozzle embodying my invention.
Figure 2:
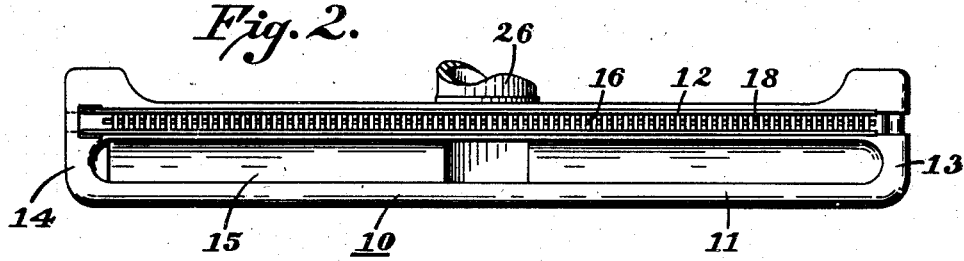
Fig. 2 is a bottom view of the nozzle shown in Fig. 1.
Figure 3:
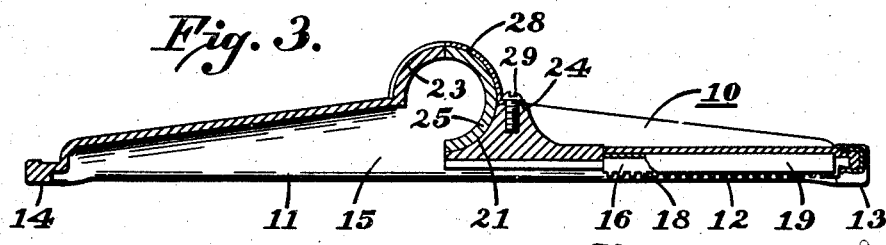
Fig. 3 is a cross-sectional view taken on the line 3—3 of Fig. 1.

Referring to the drawing, reference character 10 designates a hollow body which includes a forward lip 11, a rear lip 12 and end lips 13 and 14, which define and bound an elongated inlet opening 15. As shown, the rear lip 12 includes a rod 16 received in a semi-circular recess 17 formed in the nozzle body. The rod is provided with a plurality of teeth 18 on the side thereof which projects beyond the recess. A sleeve 19 is rotatably mounted on the rod and may be rotated so as to cover or uncover the teeth 18.

Located centrally in the rear wall on the nozzle body is a circular outlet opening 20. Extending outwardly from the lower half of this opening is a semi-circular concave seat 21 provided with a rib or flange 22 which projects radially from the seat. Above the upper half of the outlet opening 20, the nozzle body is formed with a semi-cylindrical convex surface 23. Adjacent to either end of the surface 23, the body is formed with flat surfaces 24. A flat semi-circular surface 23a extends radially around the upper half of outlet 20 and between the outlet and the surface 23.

Rotatably received on the seat 21 is the cylindrical portion 25 of a hollow outlet member 26. The outer diameter of portion 25 is the same as the diameter of the seat 21. The portion 25 is formed with an annular groove 27 extending completely therearound and adapted to be engaged by the flange 22 on the nozzle body. Portion 25 is formed with a plane circular end 27a, which contacts the flat surface 23a on the body.

A strap or band 28 having a semi-circular central portion and straight end portions is secured to the nozzle body by means of bolts 29 which extend through holes formed in the straight portions of the band and which engage threaded openings extending into the body from the flat surfaces 24. When thus secured in place, the band or strap 28 is supported by the semi-cylindrical convex surface 23 and also contacts the cylindrical outer surface of the outlet member 26 to thus hold the member in place on the seat 21. The support given the band by the surface 23 maintains the band in circular shape and prevents it from binding against the member 26. If desired, the strap 28 is formed with an inwardly extending flange 30 which engages the groove 27 on the member 26.

Figure 4:
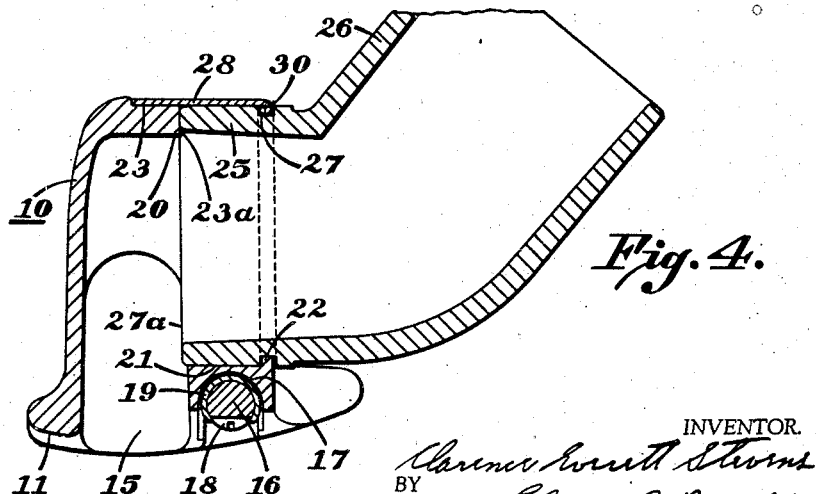
Fig. 4 is a cross-sectional view, on an enlarged scale, taken on the line 4—4 of Fig. 1.

With the parts assembled, the member 26 may rotate on the seat 21 and within the band 28, the flanges 22 and 30 preventing axial movement of the outlet member. This member is preferably made angular, as shown particularly in Fig. 4, so that a rigid hollow handle connected thereto normally extends in an upwardly inclined direction so as to be conveniently held by an operator standing in an erect position, the nozzle being on the floor. However, if it is desired to manipulate the nozzle under low furniture, the handle may be lowered without affecting the position of the nozzle body by virtue of the rotation between the outlet member 26 and the rest of the nozzle.

As is well known, the hollow handle is connected to a source of suction in any suitable manner, as by a flexible hose, and air is caused to flow into the inlet opening 15, through the outlet opening 20 and into the outlet member 26. Inasmuch as the structure for securing the outlet member 26 of the nozzle body is disposed entirely outside of this path of flow, it can impose no resistance to flow nor create turbulence. At the same time, a substantially airtight and freely rotatable joint is provided.

While I have shown one more or less specific embodiment of my invention, it is to be understood that this has been done for the purpose of illustration only and that the scope of my invention is not to be limited thereby, but is to be determined by the appended claims.

What I claim is:

1. In a suction nozzle, a hollow body formed with an inlet opening and an outlet opening, said body having a plane surface surrounding at least a portion of said outlet opening and a semi-cylindrical concave seat extending outwardly adjacent to said outlet opening and at right angles to said plane surface, a hollow outlet member having a flat end abutting said plane surface and a cylindrical outer surface rotatably received on said seat, and a semi-circular strap secured to said body and engaging the cylindrical surface of said member to retain the latter in engagement with said seat.

2. In a suction nozzle, a hollow body formed with an inlet opening and an outlet opening, said body having a semi-cylindrical concave seat extending outwardly adjacent to said outlet opening, a hollow outlet member having a cylindrical outer surface rotatably received on said seat, said member being formed with a groove extending circumferentially therearound, means projecting from said seat for engaging said groove, a semi-circular strap removably secured to said body and engaging the cylindrical surface of said member, and a flange on said strap engaging said groove.

3. In a suction nozzle, a hollow body having an inlet opening and an outlet opening, said body having a plane surface surrounding at least a portion of said outlet opening and a semi-cylindrical concave seat extending outwardly adjacent to the lower half of said outlet opening and at right angles to said plane surface, and having a semi-cylindrical convex surface above the upper half of said outlet opening, a hollow outlet member having a flat end abutting said plane surface and a cylindrical outer surface rotatably received on said seat, and a semi-circular band secured to said body in contact with the semi-cylindrical convex surface thereon and engaging the cylindrical surface of said member to retain the latter in place on said seat.

4. In a suction nozzle, a hollow body having an inlet opening and an outlet opening, said body having a semi-cylindrical concave seat extending outwardly adjacent to the lower half of said outlet opening, and having a semi-cylindrical convex surface above the upper half of said outlet opening, said body being formed with a flat surface adjacent to either end of said convex surface, a hollow outlet member having a cylindrical outer surface rotatably received on said seat, and a band having a semi-circular central portion and straight end portions, and means for removably securing said end portions to said flat surfaces with said semi-circular portion supported by said convex surface and overlying the cylindrical surface of said member to retain the latter in place on said seat.

5. In a suction nozzle, a hollow body having an inlet opening and an outlet opening, said body having a semi-cylindrical concave seat extending outwardly adjacent to the lower half of said outlet opening, and having a semi-cylindrical convex surface above the upper half of said outlet opening, a hollow outlet member having a cylindrical outer surface rotatably received on said seat, said member being formed with a groove extending circumferentially therearound, means projecting from said seat for engaging said groove, a semi-circular band secured to said body in contact with the semi-cylindrical convex surface thereon and engaging the cylindrical surface of said member to retain the latter in place on said seat, and means projecting from said band for engaging said groove.

6. In a suction nozzle, a hollow body having an inlet opening and an outlet opening, said body having a semi-cylindrical concave seat extending axially outwardly adjacent to the lower half of said outlet opening, and having a flat semi-circular surface extending radially around the upper half of said outlet opening, a hollow outlet member having a plane circular end and a cylindrical outer surface rotatably received on said seat, and a semi-circular band secured to said body and engaging the cylindrical surface of said member to retain the latter in engagement with said seat and with the plane end of said member in contact with said flat semi-circular surface.

7. In a suction nozzle, a hollow body having an inlet opening and an outlet opening, said body having a semi-cylindrical concave seat extending axially outwardly adjacent to the lower half of said outlet opening, and having a semi-cylindrical convex surface above the upper half of said outlet opening, and having a flat semi-circular surface extending radially between the upper half of said outlet opening and said convex surface, a hollow outlet member having a plane circular end and a cylindrical outer surface rotatably received on said seat, and a semi-circular strap secured to said body in contact with said convex surface and engaging the cylindrical surface of said member to retain the latter in engagement with said seat and with the plane end of said member in contact with said flat semi-circular surface.

CLARENCE EVERETT STEVENS.